US012135612B2

(12) United States Patent
Balasubramanian et al.

(10) Patent No.: US 12,135,612 B2
(45) Date of Patent: Nov. 5, 2024

(54) SNAPSHOTTING HARDWARE SECURITY MODULES AND DISK METADATA STORES

(71) Applicant: Oracle International Corporation, Redwood Shores, CA (US)

(72) Inventors: Suryanarayanan Balasubramanian, Redmond, WA (US); Augustine Varun Mathew, Austin, TX (US); Hamidreza Eftikhar-Dadkhah, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/719,010

(22) Filed: Apr. 12, 2022

(65) Prior Publication Data

US 2022/0382637 A1 Dec. 1, 2022

Related U.S. Application Data

(60) Provisional application No. 63/194,023, filed on May 27, 2021.

(51) Int. Cl.
*G06F 11/00* (2006.01)
*G06F 11/14* (2006.01)
*H04L 9/08* (2006.01)

(52) U.S. Cl.
CPC ...... *G06F 11/1435* (2013.01); *G06F 11/1464* (2013.01); *G06F 11/1469* (2013.01); *H04L 9/0825* (2013.01); *H04L 9/0877* (2013.01); *G06F 2201/84* (2013.01)

(58) Field of Classification Search
CPC ............ G06F 11/1464; G06F 11/1469; H04L 9/0825; H04L 9/0877
See application file for complete search history.

(56) References Cited

U.S. PATENT DOCUMENTS

| | | | | |
|---|---|---|---|---|
| 8,706,833 | B1* | 4/2014 | Bergant | G06F 16/1756 |
| | | | | 709/215 |
| 9,864,874 | B1* | 1/2018 | Shanbhag | H04L 63/10 |
| 10,372,926 | B1* | 8/2019 | Leshinsky | H04L 9/083 |
| 10,657,004 | B1* | 5/2020 | Dalmia | G06F 11/1446 |
| 11,640,484 | B1* | 5/2023 | Kumar | G06F 21/6209 |
| | | | | 726/26 |
| 11,809,735 | B1* | 11/2023 | Kumar | G06F 3/067 |
| 11,853,581 | B2* | 12/2023 | Mandagere | G06F 11/1469 |

(Continued)

*Primary Examiner* — Loan L. T. Truong
(74) *Attorney, Agent, or Firm* — Invoke

(57) ABSTRACT

The present disclosure relates to capturing snapshots of key management data and storing the snapshots for efficient re-creation of the key management data in the event of an outage at one or more nodes. A snapshot orchestrator can request snapshot instances from each of the series of nodes across one or more regions in a cloud infrastructure service. Each snapshot instance can provide a plurality of modifications to a plurality of client keys maintained by each of the series of nodes. The snapshot orchestrator can obtain the snapshot instances and corresponding metadata and verify the snapshot instances received from the series of nodes. The snapshot orchestrator can store the verified snapshot instance and corresponding metadata at a storage node. This can allow for subsequent retrieval of the snapshot instance and recreating the log record and modifications to the plurality of keys at any of the series of nodes.

20 Claims, 11 Drawing Sheets

(56) References Cited

U.S. PATENT DOCUMENTS

| | | | |
|---|---|---|---|
| 2014/0142860 A1* | 5/2014 | Lu | G01V 1/282 |
| | | | 702/16 |
| 2014/0156618 A1* | 6/2014 | Castellano | G06F 16/13 |
| | | | 707/703 |
| 2015/0199731 A1* | 7/2015 | Jevtic | G06Q 30/0243 |
| | | | 705/14.73 |
| 2019/0012104 A1 | 1/2019 | Schreter | |
| 2019/0370353 A1 | 12/2019 | Doddameti et al. | |
| 2020/0065239 A1* | 2/2020 | Shayesteh | G06F 12/0253 |
| 2020/0104498 A1* | 4/2020 | Smith | G06N 20/20 |
| 2020/0242225 A1* | 7/2020 | Mullins | G06F 21/35 |
| 2021/0103499 A1* | 4/2021 | Alluboyina | G06F 3/067 |
| 2021/0271565 A1* | 9/2021 | Bhavanarushi | G06F 11/1464 |
| 2021/0286535 A1* | 9/2021 | Aldred | G06F 11/3442 |
| 2021/0406216 A1* | 12/2021 | Komatsu | G06F 16/128 |
| 2022/0156246 A1* | 5/2022 | Froese | G06F 16/219 |
| 2022/0374519 A1* | 11/2022 | Botelho | G06F 9/45558 |
| 2023/0134314 A1* | 5/2023 | Braganza | H04L 67/1097 |
| | | | 707/609 |

\* cited by examiner

SNAPSHOTTING HARDWARE SECURITY MODULES AND DISK METADATA STORES

CROSS-REFERENCE TO RELATED APPLICATIONS

The present application claims priority to U.S. Provisional Patent Application No. 63/194,023, titled "SNAPSHOTTING HARDWARE SECURITY MODULES AND DISK METADATA STORES," and filed May 27, 2021, the entirety of which is incorporated by reference herein.

BACKGROUND

A cloud infrastructure (CI) system can execute a plurality of functions, such as an ability to store data across nodes (e.g., servers) in the CI system and allow querying of the stored data. Further, the CI system can store and maintain volumes of client data. In many instances, the client data can be encrypted using keys such that the client data may only be accessed and/or modified responsive to providing an appropriate key. The keys for the client can be used to encrypt/decrypt portions of client data across the CI system.

Furthers, as client data is added or modified in the CI system, the plurality of keys can be modified. For example, new keys can be added to encrypt a new dataset or a key can be removed from the plurality of keys responsive to another dataset being removed from the CI system. The modifications to a plurality of keys relating to a client can be logged and maintained by one or more nodes in the CI system. For instance, as keys are added, removed, modified, etc., a key management node can log and store all modifications to the plurality of keys and associated metadata on one or more security modules in the CI system. The key management node can be used to retrieve keys and decrypt encrypted client data across the CI system.

SUMMARY

The present embodiments relate to capturing snapshots of key management data and storing the snapshots for efficient re-creation of the key management data in the event of an outage at one or more nodes. A first exemplary embodiment relates to a method for capturing a snapshot of key management data across a series of nodes. The method can include requesting, by a snapshot orchestrator, snapshot instances from each of the series of nodes across one or more regions in a cloud infrastructure service. Each snapshot instance can provide a plurality of modifications to a plurality of client keys maintained by each of the series of nodes. Further, each modification can correspond with an entry in a log record.

The method can also include obtaining, by the snapshot orchestrator from each of the series of nodes, the snapshot instances and corresponding metadata. The method can also include verifying the snapshot instances received from the series of nodes. The method can also include, responsive to verifying the snapshot instances, storing the snapshot instance and corresponding metadata at a storage node. This can allow for subsequent retrieval of the snapshot instance and recreating the log record and modifications to the plurality of keys at any of the series of nodes.

Another example embodiment relates to a snapshot management system. The snapshot management system can comprise a processor and a non-transitory computer-readable medium. The non-transitory computer-readable medium includes instructions that, when executed by the processor, cause the processor to request snapshot instances from each of the series of nodes. Each snapshot instance can provide a plurality of modifications to a plurality of client keys maintained by each of the series of nodes. Each modification can correspond with a log sequence record in an append-only log record.

The instructions can further cause the processor to obtain, from each of the series of nodes, the snapshot instances and corresponding metadata. The instructions can further cause the processor to verify the snapshot instances received from the series of nodes based on identified entropy values of each of the snapshot instances. The instructions can further cause the processor to, responsive to verifying the snapshot instances, store the snapshot instance and corresponding metadata at a storage node. The snapshot instance and corresponding metadata can be configured to be used for recreating the append-only log record and modifications to the plurality of keys at any of the series of nodes.

Another example embodiments relates to a non-transitory computer-readable medium. The non-transitory computer-readable medium can include stored thereon a sequence of instructions which, when executed by a processor, causes the processor to execute a process. The process can include requesting snapshot instances from each of a series of nodes across one or more regions in a cloud infrastructure service. Each snapshot instance can specify a plurality of modifications to a plurality of client keys maintained by each of the series of nodes. Further, each modification can correspond with an entry in a log record.

The process can further include obtaining the snapshot instances and corresponding metadata from each of the series of nodes. The process can further include verifying the snapshot instances received from the series of nodes by determining that entropy values for each of the received snapshot instances are within a threshold similarity. The process can further include, responsive to verifying the snapshot instances, storing the snapshot instance and corresponding metadata at a storage node. This can allow for subsequent retrieval of the snapshot instance and recreating the log record and modifications to the plurality of keys at any of the series of nodes.

DETAILED DESCRIPTION

Figure 1:
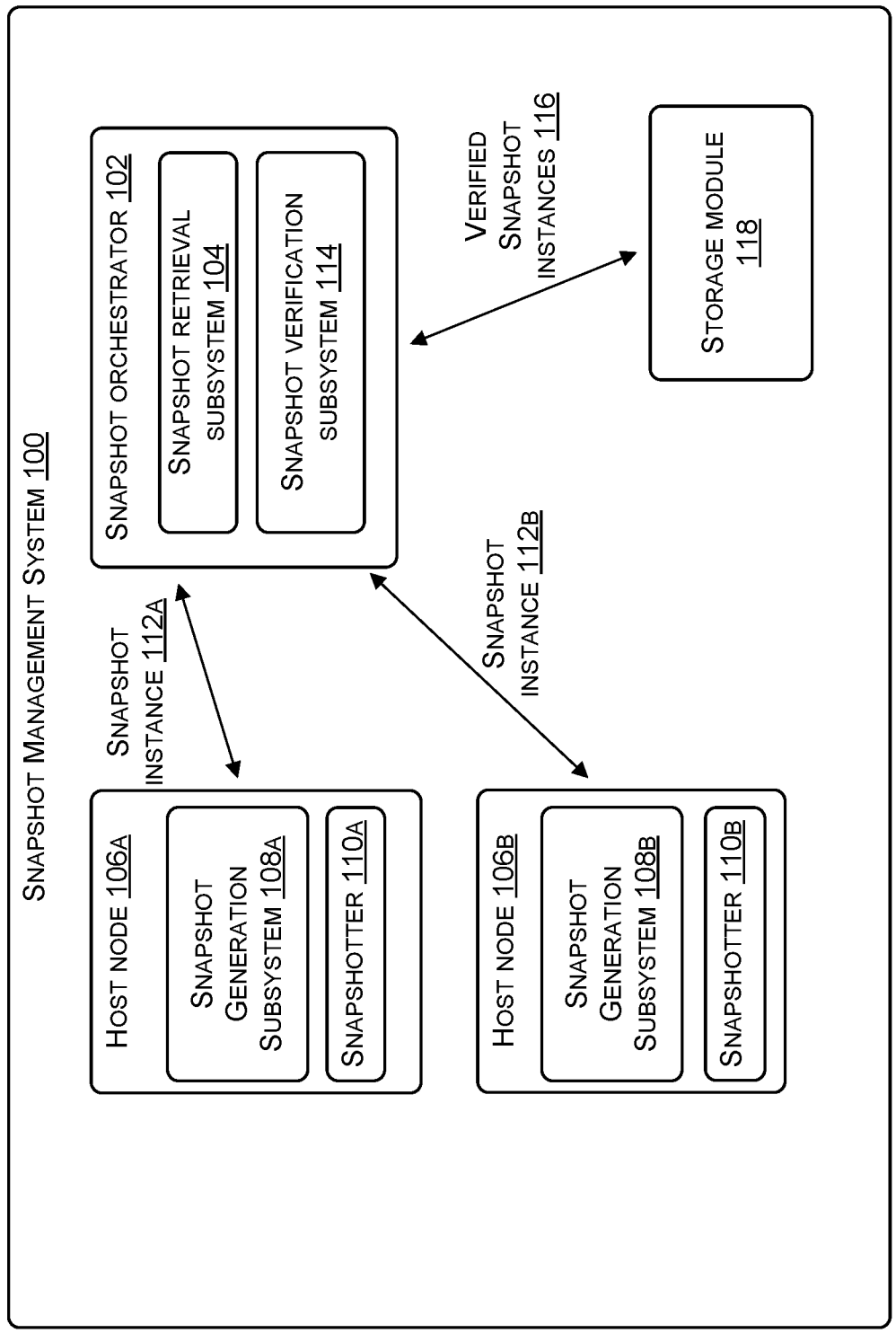
FIG. 1 is a block diagram of an example snapshot management system, according to at least one embodiment.

A cloud infrastructure (CI) service can include one or more storage modules (or "vaults") for securely managing and storing cryptographic keys across various CI services and applications. The CI vault can include a secure and resilient managed service that allows for secure data encryption while maximizing efficiency in performing hardware provisioning and/or software patching with high availability.

In a CI service, security sensitive workloads can utilize cryptographic keys stored in Hardware Security Modules (HSMs) for encryption. The CI service can provide key management services using the HSMs. Client keys can be stored in a vault, and with cross-regional replication of keys, the client can recover from a regional failure by replicating keys across regions in the CI service. Responsive to replication being enabled for a client, existing and new keys can be replicated with associated metadata with an accurate replication status.

A CI key management service can use HSMs to store customer keys. Each HSM can include several partitions that provide a logical and security boundary for the keys stored in each HSM. Responsive to a client creating a vault, the vault can include an associated partition with all the keys inside the vault created in that partition. Contents of one partition may not be able to be shared with another unless they share the same chain of trust, maintaining a security blast radius local to a single partition.

The HSMs can be modeled into a replicated state machine (RSM). Each customer facing vault can include an associated write ahead log (WAL). The WAL can record operations on their vault including but not limited to creation and deletion of keys, metadata updates in an ordered fashion. The WALs can be stored in an internal CI durable key-value store that supports transactional reads and writes. Similar to the calculator as described above, a vault can be fully recreated from applying the entries in WAL associated with the vault.

Further, when a vault is created for a client, an associated partition in a HSM can be replicated across hosts in data centers within a region by default. With cross regional replication enabled on the vault, the WAL can be relayed to the destination region and apply to all the hosts in that region as well. By default, client keys can be replicated across hosts distributed among data centers. KMS services in a region can run inside a firewall with no access to an external network (e.g., the internet). To enable cross regional communication, a high performance RESTful service (e.g., WAL Service) can be run in each region that can take WAL traffic from KMS services to other regions within a realm. The cross regional calls from one region to a WAL service in another region can go through an access controlled proxy at the edge of source region. Any of the services can incorporate representational state transfer (REST) techniques, distributed geographically, and executed with one or more load balancers. Each write ahead log (WAL) can include an append-only log comprising modifications to keys over time. Each WAL can include a series of entries, with each entry having an associated log sequence number (LSN). The LSN can be monotonically dense and increase for each WAL entry.

Further, a CI KMS can include multiple distributed services that work together across multiple regions. However, processing across the regions can cause various problems (e.g., problems arising from Byzantine faults). For example, in such a distributed system including multiple regions, incidents can arise leading to partial or full loss of hosts, disks, data stores, HSMs, or network issues that lead to data corruption in transit, out of order delivery of messages, or partitions. Further, this can cause bugs or incidents manipulating data in the WALs or other data center faults. In response, the WAL can include the entirety of various system states related to that customer vault so that services can be stateless. Each WAL entry can encode both client data and metadata about the CI service.

For instance, for any of a variety of reasons, a node hosting the key management service (e.g., a hardware security module (HSM)) can malfunction or lose functionality. For instance, in a mass outage event, devices hosting the HSM can lose power or functionality, which can result in the loss of data in the HSM. In the event of loss of key management service data, the plurality of keys (and a tracked log of the keys) can be lost, resulting in an inability to access encrypted client data.

In some instances, the CI KMS can be a sharded system with multiple region shards. A region shard identifier can encode a combination of a CI realm, region, and KMS shard as an integer. The region shard identifier can include a 32 bit integer representing each shard across regions/realms. This can allow for efficient computation for generating a membership of WALs.

Further, multiple WALs can be compared to determine whether the WALs are the same until the specified point. This can be performed by calculating an incremental checksum of each log entry and comparing the actual and computed entropy values during a recalculation. Performing an anti-entropy check can assist to identify bit flips or resolve conflicts between WALs and converge WALs between regions.

Further, each WAL can include a large number (e.g., millions) of entries. Accordingly, applying multiple WALs each time a host needs to be bootstrapped or cross regional replication is set up for a client can be inefficient. To replicate WAL data across regions, snapshots of the WALs can be taken periodically and replicated across regions. Each snapshot can include an entropy value. Snapshots can be taken on every single state machine at a same point in time and a centralized snapshot orchestrator can compare the entropy values and promotes a snapshot as valid after a consensus. Further, the data can be processed to determine whether bit flips occurred by performing a checksum of the entire snapshot.

In many instances, varying snapshotting approaches can be utilized to capture snapshots for RSMs. A first snapshotting approach can include a stop the world snapshot, where no changes are permitted to be made on the state of the RSMs while a snapshot is being taken. Another example snapshotting approach can include concurrent snapshot, where a snapshot is being taken while new operations are being processed, where WAL records can be processed while a snapshot is being taken. Further, a complete snapshot can contain the entire replicated state associated with an LSN. Alternatively, an incremental snapshot can include a series of snapshots where one snapshot relies on the previous snapshots. The incremental snapshot can be used to decrease the size of the snapshot and also the time taken to create a snapshot.

The present embodiments relate to capturing snapshots of the key management service data (e.g., a WAL of a plurality of keys). A snapshot orchestrator can initiate a snapshot across multiple hosts at a particular instance (e.g., at a specified log sequence number (LSN) of the WAL) and synchronize the obtained snapshots. The LSN can include a monotonically dense and increasing sequence number that can be used to order WAL entries. The saved snapshots can comprise a resilient replication of log data that hosts can recover efficiently in the event of an outage at the CI system.

The present embodiments can implement a snapshot orchestrator that can periodically orchestrate snapshotting of data based on various thresholds. The snapshot orchestrator can implement a verification (anti-entropy) process to confirm and verify snapshot content across hosts in a cluster of host devices. Further, the snapshot orchestrator can obtain contents from one or more HSMs with metadata such that client data does not leave a device or system boundary in accordance with one or more standards/protocols. The snapshot data can be encrypted and check-summed to ensure security of the snapshot data. For instance, a portion of the snapshot data can be derived from the snapshot data and compared with the snapshot data to detect errors in the snapshot data or verify the integrity of the snapshot data. The snapshot data can be stored across multiple devices (e.g., a cross regional storage). Further, the payload structure of snapshot data and truncation of snapshot data can enable an efficient restoration of the snapshot data without an exponential increase of memory resources.

A snapshot orchestrator can include a log record handler that handles applying individual log records of a particular type. A WAL processor can process WALs and can dispatch WALs to one or more log record handlers. The WAL processor can maintain a current state (e.g., a current LSN) when a WAL record is applied. A WAL manager can manage WAL processors based on the WALs added/removed from the system.

In some embodiments, a method for obtaining a snapshot of key management data is provided. A snapshot orchestrator service executing on a device in the CI system can perform the method as described herein. A snapshot orchestrator can send a request for snapshot data from a plurality of host devices. The snapshots captured by the host devices can include key management data (e.g., a WAL providing a string of modifications to a plurality of keys encrypting client data), and any metadata associated with the snapshot data (e.g., identifying the host device, a LSN instance in which the snapshot data was obtained). The plurality of host devices can include HSM nodes and/or database nodes disposed across one or more regions in the CI system.

The request for snapshot data can be sent to a series of host devices. The snapshot services can obtain the snapshot instances at each host device and provide data (e.g., an entropy value of snapshot data) to the snapshot orchestration device. The snapshot services can obtain the snapshot data responsive to the snapshot data being in a specified state (e.g., a specified LSN instance in a write append log (WAL)). In some instances, the snapshot orchestrator can compare obtained entropy values received from the snapshot services and, on success, can upload a set of snapshot data to an external persistent store.

The snapshot orchestrator device can obtain the snapshot instances from the plurality of host devices and verify the snapshot data. This can include executing a verification or anti-entropy process to verify the snapshot data. In some instances, the WAL can be truncated at a point where the snapshot was taken to remove a portion of the WAL prior to a specified LSN instance.

The snapshot orchestrator can store the snapshot data in a storage node. In some instances, a primary storage node can act as a point of truth for a snapshot data instance for coordination/synchronization of snapshot data across nodes in the cross region storage. In the event of an outage event or the loss of key management data, the snapshot data can be retrieved to efficiently provide key data for the client.

A. Snapshot Management System Overview

The system as described herein can store client keys in one or more Hardware Security Modules (HSMs) and associated metadata on an on disk store across one or more regions. This can be done by an internal replication system that keeps data synchronized across these hosts in different regions. Further, the system as described herein can periodically take snapshots of these HSMs and associated metadata stores to back up the client key data and to compact replication logs. This can allow for efficient retrieval of key data in the event of a failure or loss of key data in one or more regions.

FIG. 1 is a block diagram of an example snapshot management system 100. The snapshot management system 100 can provide a snapshotting infrastructure that efficiently captures snapshot instances and associated metadata. The snapshot management system 100 can periodically orchestrate snapshotting based on various configurable thresholds. The snapshot management system 100 can further verify obtained snapshot instances (e.g., by performing an anti-entropy check).

In some instances, the snapshot management system 100 can encrypt or perform a checksum of the snapshot instances to increase security of the snapshot instances. Further, the snapshot management system 100 can allow for cross-regional storage of snapshot instances. A payload structure of the snapshots can allow for an efficient restoration of the snapshot instance without memory ballooning.

As shown in FIG. 1, the snapshot management system 100 can include a snapshot orchestrator 102. The snapshot orchestrator 102 can request snapshot instances from a number of host nodes (e.g., 106 A-B) across one or more regions. The snapshot orchestrator 102 can further process obtained snapshot instances (e.g., WAL log records) to verify the snapshot instances. Responsive to the verification of the snapshot instances, the instances can be stored for subsequent retrieval.

The snapshot orchestrator 102 can include a snapshot retrieval subsystem 104. The snapshot retrieval subsystem 104 can initiate a request for snapshot instances from host nodes 106 A-B. For instance, the snapshot retrieval subsystem 104 can add an entry (e.g., at a LSN instance) to a WAL requesting a snapshot be taken at the specified LSN instance. As another example, the snapshot retrieval subsystem 104 can send a message to the host nodes 106 A-B requesting a snapshot be taken by each host node 106 A-B.

The snapshot orchestrator 102 can run within a cluster manager and can initiate a snapshot on the host nodes by adding a new entry into the WAL. The snapshot orchestrator 102 can perform an anti-entropy check. For instance, on a failure of the anti-entropy check, if a portion of host nodes have a common anti-entropy value, then the nodes on which the snapshot failed is removed and allowed to catch up. Alternatively, an alarm can be raised.

The snapshot management system 100 can include a number of host nodes (e.g., 106 A-B). The host nodes 106 A-B can include HSMs disposed across multiple regions in a CI service. Each host node 106 A-B can maintain an individual log record of all keys created/removed for a client. Further, each host node 106 A-B can include a snapshot generation subsystem 108 A-B to detect a request to capture a snapshot, interact with snapshotters 110 A-B to capture the snapshot, and provide the snapshot instances to the snapshot orchestrator 102. A snapshotter may be a worker node running within each replica/service instance that is configured to perform snapshotting-related tasks (e.g., performing snapshotting, local storage of snapshots, pulling/pushing of remote snapshots, etc.).

Each snapshotter 110 A-B can execute within each host node instance 106 A-B. The snapshotters 110 A-B can be part of a write ahead log manager and can be responsible for local snapshotting and storage of snapshots. The snapshotter 110 A-B can expose a set of application programming interfaces (APIs) that can be called by the snapshot orchestrator 102. In some instances, a number of previous snapshots can be remotely stored at each snapshotter 110 A-B.

The snapshot retrieval subsystem 104 can obtain snapshot instances 112 A-B provided by each host node 106 A-B. The snapshot instances 112 A-B can be provided to snapshot verification subsystem 114 for verification of the snapshot instances 112 A-B. For example, the snapshot verification subsystem 114 can compare the snapshot instances 112 A-B to identify any discrepancies in the instances 112 A-B, truncate the snapshot instances 112 A-B, perform an anti-entropy check, etc.

The validated snapshot instances 116 can be stored at a storage module 118. The storage module 118 can maintain a number of snapshot instances for subsequent retrieval in the event of a failure of any host node 106 A-B. For example, responsive to failure of a host node 106a, a most recent snapshot instance can be provided to the host node 106a to replicate the WAL for the client.

Figure 2:
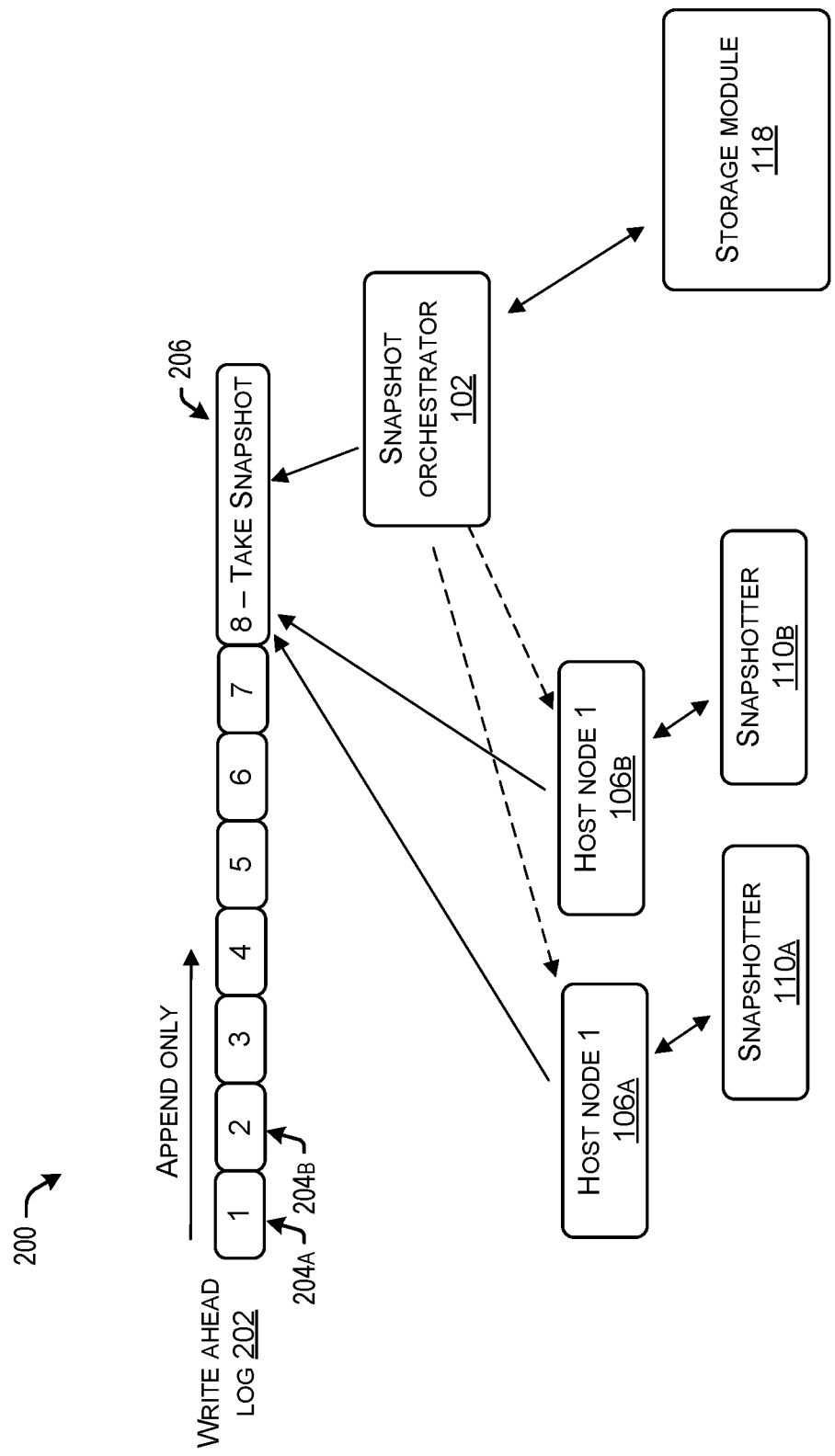
FIG. 2 illustrates a block diagram of an example of a system for capturing snapshots of key management data, according to at least one embodiment.

FIG. 2 illustrates a block diagram 200 of an example of a system for capturing snapshots of key management data. As shown in FIG. 2, a snapshot orchestrator 102 can request snapshots from a series of snapshot services executing on host devices. As shown in FIG. 2, a write ahead log 202 can include an append only log that can include a number of instances (e.g., 204 A-B). Further, the snapshot orchestrator 102 can add an entry (e.g., 206) to the WAL 202 including a LSN instance instructing host nodes 106 A-B to capture snapshots. The host nodes 106 A-B can, in turn, identify the WAL instance 206 in the WAL 202 and initiate capturing of the snapshot instances as described herein.

The snapshot orchestrator 102 can orchestrate the snapshotting process across multiple host nodes can be responsible for pushing snapshots into a storage module 118 for long term storage. Each region can include a pair region for cross region redundancy. The snapshot orchestrator 102 can push snapshots to the storage module 118 for each region. The storage module 118 can delete snapshots associated with the WAL after a preconfigured tombstoning interval (e.g., after 30 days).

The snapshot orchestrator 102 can track WAL snapshots and associated metadata in a table (e.g., a database like a key value store database or the like). The snapshot orchestrator 102 can run as a lease-based daemon and periodically request snapshots based on a time interval. The snapshot orchestrator 102 can expose APIs to perform snapshots on demand by writing to a WAL 202. Further, the snapshot orchestrator 102 daemon can perform truncation of the WAL based on a most recent snapshot LSN. The snapshots can be initiated responsive to one or more conditions being met. An example condition can be based on a latest snapshot creation time being greater than a snapshot interval and a state of the latest snapshot being in progress. Another example condition can be based on a latest LSN in the WAL being greater than a maximum permitted records in the WAL. In response to any conditions being met, a log entry can be written to the WAL and a snapshot metadata record can be added to a metadata table with the snapshot being in progress.

In some instances, multiple key partition backups can capture a snapshot for a partition of a HSM. This can provide an encrypted snapshot for each partition on an HSM. Any backup function provided by the HSM (configuration, keys, and users) can be included in an encrypted blob. Backups can be verified and accuracy of the data can be checked in order to assure accuracy in the snapshots (e.g., using a cyclic redundancy check (CRC) like a CRC32 error-detection algorithm or the like). This verification can include running a checksum, as partition data may be read from a card. The backup can be stored in a designated storage and, when a restore function is initialized, the restore function can be run on a new temporary partition with an integrity check passed.

In some instances, when a snapshot entry is detected in the WAL, all host nodes may run the backup on their HSM cards. However, due to the backups being encrypted, it may be difficult to compare backups to one another. Accordingly, all data for each backup type can be downloaded and returned with an encrypted blob of data. The orchestrator can then sort the data using metadata and compare the backups to determine whether the backups point to the same objects.

Each host node 106 A-B can implement a snapshotter 110 A-B. Snapshotters 110 A-B can run as part of the write ahead log manager. The snapshotters 110 A-B can capture snapshots and locally save the snapshots. The snapshotters 110 A-B can further expose APIs allowing for a returning of a status of the snapshotters associated with a particular LSN, list snapshots that are locally present for LSNs, and return snapshots that can be written directly to local/remote storage modules.

The snapshotters 110 A-B can capture a new local snapshot. A request for a snapshot can flow through the WAL for each host node 106 A-B using a specific log record type. The WAL manager can then invoke the WAL processor to acquire a snapshot with a snapshot writer responsible for writing the snapshot and associated metadata.

In some instances, a snapshot can be stored a collection of "mini" snapshots within an overall snapshot for a WAL. Each log record handler processor can be responsible for versioning its data in the snapshot associated with the particular log record handler. The snapshot writer can be responsible versioning the overall snapshot file along with performing integrity checks. The integrity check can be signed with an encryption key value of the snapshot via a private key available on each individual machine.

Downloaded snapshots and/or locally saved snapshots are saved in a subdirectory directory in within a WAL manager. The snapshots and each corresponding device state can be managed by a snapshot manager. Each snapshot can reside in the storage subdirectory with the specified LSN as its name with a marker file indicting whether the snapshot is complete and verified.

B. Snapshot Orchestrator

As described above, a snapshot orchestrator can obtain snapshots from one or more host nodes and maintain the snapshots (and corresponding metadata) to recreate a WAL in the event of a loss in any of the host nodes. For example, responsive to a failure in a region comprising a host node, the snapshot orchestrator can provide the snapshot and associated metadata to the host node to re-create the WAL providing client key management data.

Figure 3:
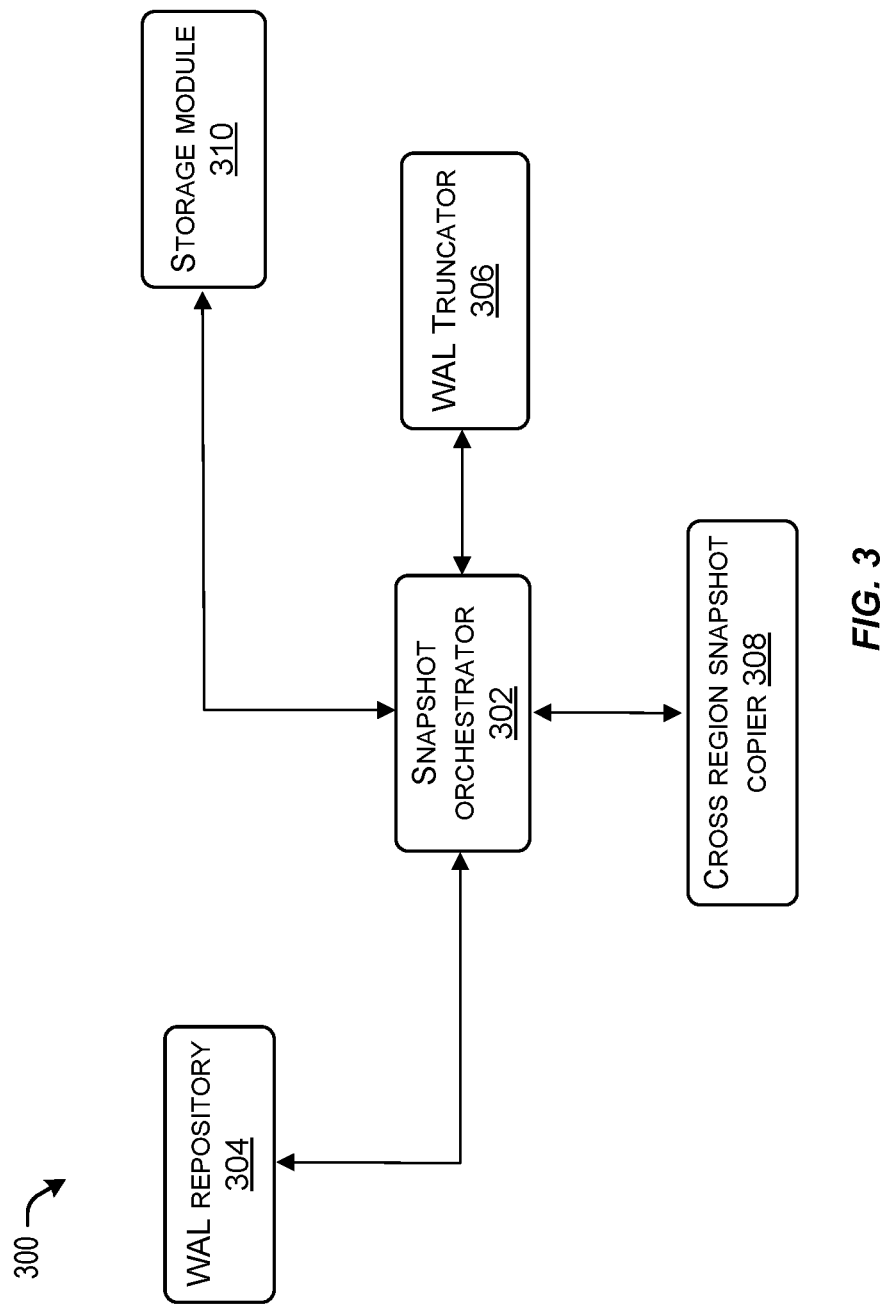
FIG. 3 illustrates a block diagram of an example snapshot orchestrator, according to at least one embodiment.

FIG. 3 illustrates a block diagram 300 of an example snapshot orchestrator 302. The snapshot orchestrator 302 can obtain snapshot data (WAL) from the one or more host nodes as described herein. The orchestrator 302 can poll obtained WALs and can perform additional processing (e.g., tombstoning). The snapshots and associated metadata received from the host nodes can be maintained by a table. The metadata can include a name of the host node, a LSN instance, a snapshot status, a time when the record was created, etc. The snapshot(s) and corresponding metadata maintained in the table can be locally stored at a WAL repository 304.

The snapshot orchestrator 302 can truncate a WAL via a WAL truncator 306. For example, the snapshots captured by each host node can be truncated at a specified LSN instance. Truncating the snapshots can reduce the size of each snapshot while also allowing for an accurate representation of the WAL for recreation of the WAL at a given host node.

The snapshots and corresponding metadata can be stored at a storage module 310. The storage module 310 can include one or more interconnected storage nodes allowing for efficient storage and retrieval of snapshot data responsive to a request for a snapshot from the orchestrator 302.

The cross region snapshot copier 308 can include a component that is in charge of shipping backups and existing snapshots between regions. The cross region snapshot copier 308 can move through the snapshot metadata table and copy snapshot data across regions if there are any discrepancies between nodes in varying regions. The cross region snapshot copier 308 can comprise a lease-based daemon that can separately connect to various regions. For each snapshot where a status indicates that the capturing of the snapshot is successful, the snapshot can be copied to the cross region snapshot copier 308. A data replication handler of the cross region snapshot copier 308 can be responsible for applying data replication WAL records into a local database. Each local database can comprise less than a threshold number of entries. In some instances, snapshotting can block only writes to the data and the database can be read by a data plane of the snapshot orchestrator while snaphotting is in progress. The local database can include key-value pair arrays. The key-value pairs can be ordered in the database by LSN values and a computed CRC32 value. As a data record is updated, the CRC32 can be incrementally modified. The CRC32 function converts a variable-length string into an 8-character string that is a text representation of the hexadecimal value of a 32-bit-binary sequence. Thus, as the data gets more accurate, the CRC32 value can improve.

C. Snapshot Data Bitmaps

Figure 4:
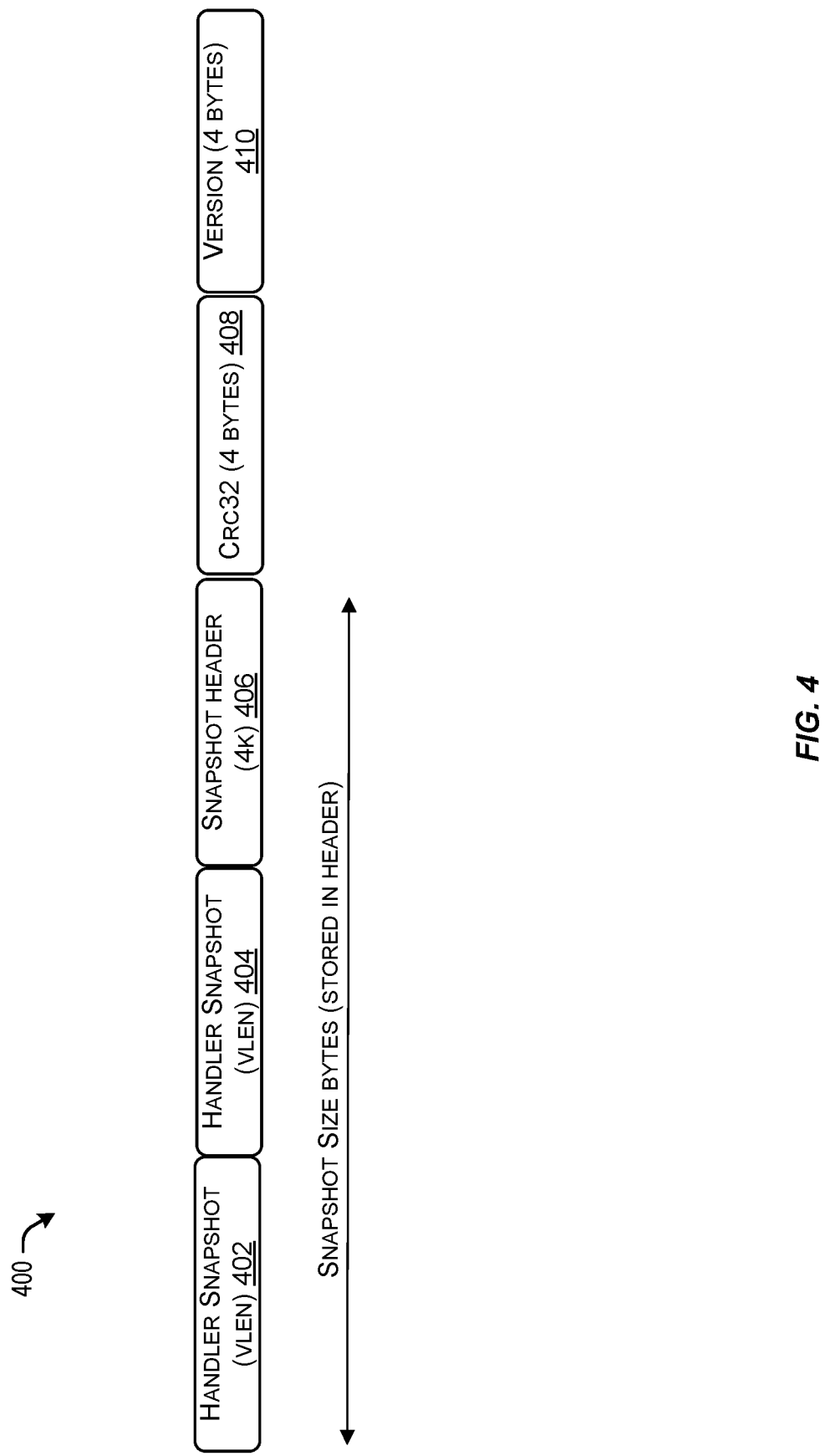
FIG. 4 is an example bitmap for a snapshot instance, according to at least one embodiment.

FIG. 4 is an example bitmap 400 for a snapshot instance. The snapshot data can include a snapshot instance obtained from a host node as described herein. The snapshot data can include multiple handler snapshots with a variable length. The handler snapshots can include individual snapshot instances obtained by each snapshot service.

The bitmap for the snapshot data 400 can include any of handler snapshot fields 402, 404, a snapshot header field 406, a CRC32 field 408, and a version field 410. For instance, a first snapshot instance (e.g., an instance from a HSM) can be included in a first handler snapshot field 402 and a second snapshot instance (e.g., from a Berkeley database (BDB) instance or the like) can be included in the second handler snapshot field 404. The snapshot instances can be combined by the snapshot orchestrator to form a snapshot payload that can later be parsed and restored by nodes (e.g., an HSM, BDB node). The handler snapshot fields 402, 404 can comprise a variable length (vlen).

The snapshot data can also include a snapshot header 406 that identifies the snapshot size in bytes. The snapshot data can be encrypted using a asymmetric key using Public Key Cryptography Standards (PKCS) enveloped encryption. The snapshot data can also include a cyclic redundancy check (CRC32) field 408 and a version field 410 specifying a version of the node providing the snapshot data. The CRC32 field 408 and version field 410 can be unencrypted to allow for confirmation of a validation of each snapshot instances without having to decrypt the snapshot instance or access a public key.

The snapshot instances can be associated a metadata file specifying metadata (e.g., names and offsets) of the handler snapshots. For example, this can include a LSN associated with the snapshot, a write ahead log name, handler snapshot metadata for each handler snapshot, a number of handler snapshots, a length of the snapshot (in bytes) including the header, the version of the snapshot, a log record type, an entropy value, etc.

Figure 5:
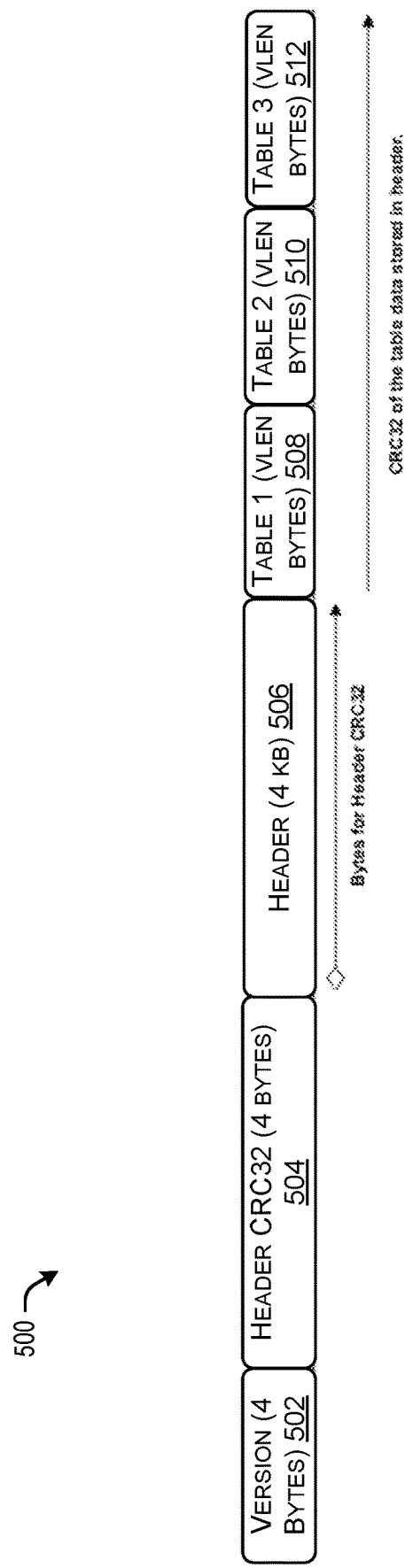
FIG. 5 illustrates a block diagram of an example snapshot file format bitmap, according to at least one embodiment.

FIG. 5 illustrates a block diagram of an example snapshot file format bitmap 500. The snapshot file format bitmap 500 can include a version field 502, a header CRC32 field 504, a header field 506, and multiple table fields (e.g., 508, 510, 512).

The version field 502 can provide a version of the snapshot. A length of the snapshot can include a signed integer (e.g., 4 bytes or the like) that limits a snapshot size to 2 GB. The header CRC32 field 504 can include 4 bytes specifying a CRC of the rest of the bytes including the header. A header field 506 can contain metadata required to index to each table. The file format can include multiple tables (e.g., in table fields 508, 510, 512) of variable length (e.g., table 1, table 2, table 3).

D. Flow Process for Capturing and Managing Snapshots of Key Management Data

Figure 6:
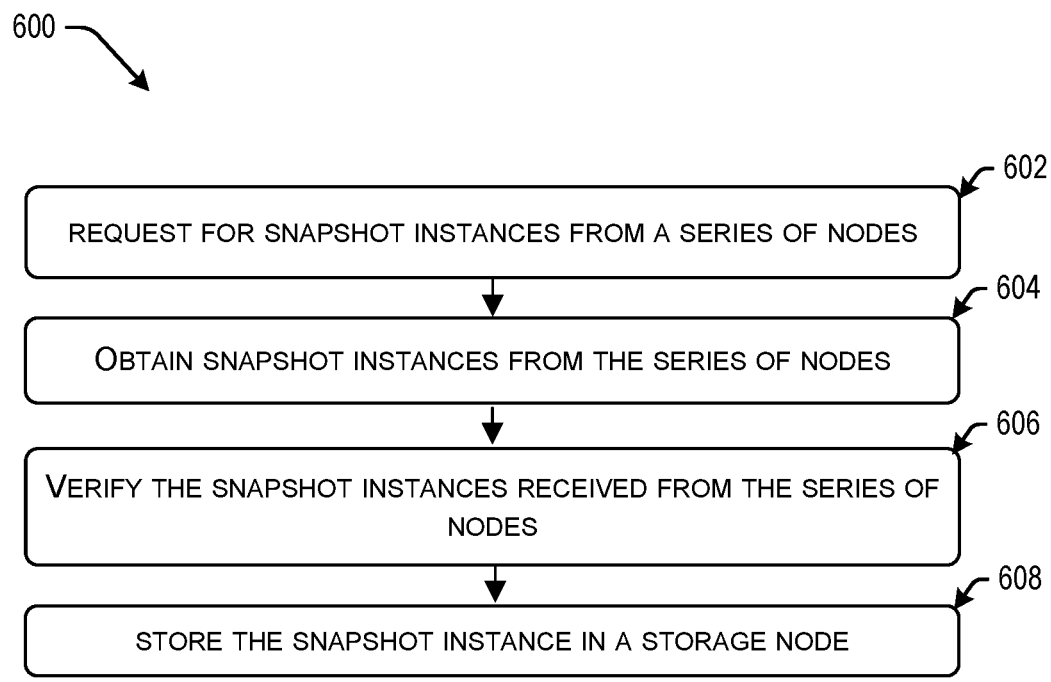
FIG. 6 is a block diagram of an example method for capturing a snapshot of key management data across a series of nodes, according to at least one embodiment.

As described above, a snapshot management system can periodically capture snapshots of key management data across a series of nodes and store the snapshots for subsequent re-creation of the key management data. For example, responsive to an outage at a first node, a most recent snapshot can be provided to the first node to re-create the key management data at the node. This can allow for efficient re-creation of key management data (e.g., modifications to client keys over time) in response to an outage event (e.g., a failure) at one or more nodes. FIG. 6 is a block diagram of an example method 600 for capturing a snapshot of key management data across a series of nodes. For instance, the method as described herein can be performed by a snapshot orchestrator (e.g., 102) interacting with host nodes (e.g., 106 A-B) as part of a snapshot management system (e.g., 100).

At 602, the method can include requesting snapshot instances from a series of nodes. Each of the series of nodes can comprise snapshotters capable of capturing a snapshot of key management data on each node. The key management data can include modifications (e.g., addition/removal) of any of a plurality of keys specific to a client. Each modification to the plurality of keys can be associated with an entry in a log record (e.g., a specified LSN instance in a write append log (WAL)). In some instances, the series of nodes can be disposed across one or more regions in a cloud infrastructure service, such as across different datacenters in varying geographic regions, for example. In this example, modifications to any of the plurality of client keys identified at a first node in a first region is synchronized across other nodes in other regions of the cloud infrastructure service by a cross region snapshot copier.

In some instances, requesting the snapshot comprises adding an entry to the log record specifying a request to capture the snapshot instances. In response, each of the series of nodes can capture the snapshot instances responsive to identifying the added entry to the log record. In some instances, the snapshot instances can be requested responsive to either an expiration of a threshold time duration (e.g., every 1 minute, every 10 minutes) or detecting an addition of a threshold number of entries to the log record (e.g., every 100 entries, every 1000 entries).

At 604, the snapshot orchestrator can obtain the snapshot instances and corresponding metadata from the series of nodes. The snapshot instances can include snapshots of logs (e.g., WALs) on each of the series of nodes. The metadata for each snapshot instance can include various aspects of the snapshot and/or the node that captured the snapshot. For example, the metadata can specify a log sequence number in the WAL that triggered the snapshot, a snapshot status, an identifier of the host node capturing the snapshot, an entropy value, etc. In some instances, the metadata includes a key to access a specified partition of the first node, each partition of the first node independently maintaining log records for a client. The snapshot orchestrator can access the partition using the key to provide the stored snapshot instance and corresponding metadata to the partition of the first node.

At 606, the snapshot orchestrator can verify the set of snapshot data. This can include identifying that the set of snapshot data includes intelligible data that can be used for recovery of the state of the keys for the client at a specified instance. Further, this can include executing a verification or anti-entropy process to verify the snapshot data.

As an example, the snapshot orchestrator can identify an entropy value specific to each snapshot instance and each corresponding node. Each entropy value can comprise a value (or series of values) derived from one or more characteristics, such as the LSN in which the snapshot was requested, a checksum value specifying a number of bytes in a header of the snapshot instance or the snapshot instance itself, a time in which the snapshot was captured, etc. The snapshot orchestrator can determine whether the identified entropy values for each of the received snapshot instances are within a threshold similarity to one another. The snapshot instances can be verified responsive to the entropy values being within the threshold similarity. For example, if all entropy values are the same or are within a threshold similarity, the snapshot instances can be verified.

In some instances, the snapshot orchestrator can truncate each snapshot instance to remove modifications to the plurality of client keys with corresponding entries in the log record prior to a specified entry of the log record. For example, if each snapshot instance includes 1000 entries, the snapshot instances can be truncated to only the 100 most recent entries to increase efficiency in storing the snapshot instance while also allowing for all relevant client keys being able to be recreated.

In some instances, responsive to verifying the snapshot instances, a table can be updated to include the metadata corresponding with the snapshot instances. The metadata can relate to any of the specified log sequence numbers of an append-only log record, a status in capturing the snapshot instances, and a timestamp in which the request for the snapshot instances was verified.

At 608, the snapshot orchestrator can store the snapshot data in a storage node and a series of host nodes (e.g., in a cross region storage). In some instances, a primary storage node can act as a point of truth for a snapshot data instance for coordination/synchronization of snapshot data across nodes independently storing the WAL. In the event of an outage event or the loss of key management data, the snapshot data can be retrieved to efficiently provide key data for the client.

As an example, the snapshot orchestrator can obtain an outage notification at a first node. This can be as a result of the first node having an outage (e.g., a power outage) or another failure of the first node occurring. The snapshot orchestrator can periodically check for outages at any of the nodes. In other instances, the node (or a corresponding alarm system) can send an outage notification responsive to detecting the outage at any of the nodes. The snapshot orchestrator can retrieve the stored snapshot instance and corresponding metadata from the storage node. Further, the snapshot orchestrator can provide the stored snapshot instance and corresponding metadata to the first node. The first node can re-create the log record specifying the modifications to the plurality of client keys using the stored snapshot instance and corresponding metadata.

E. IaaS Overview

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
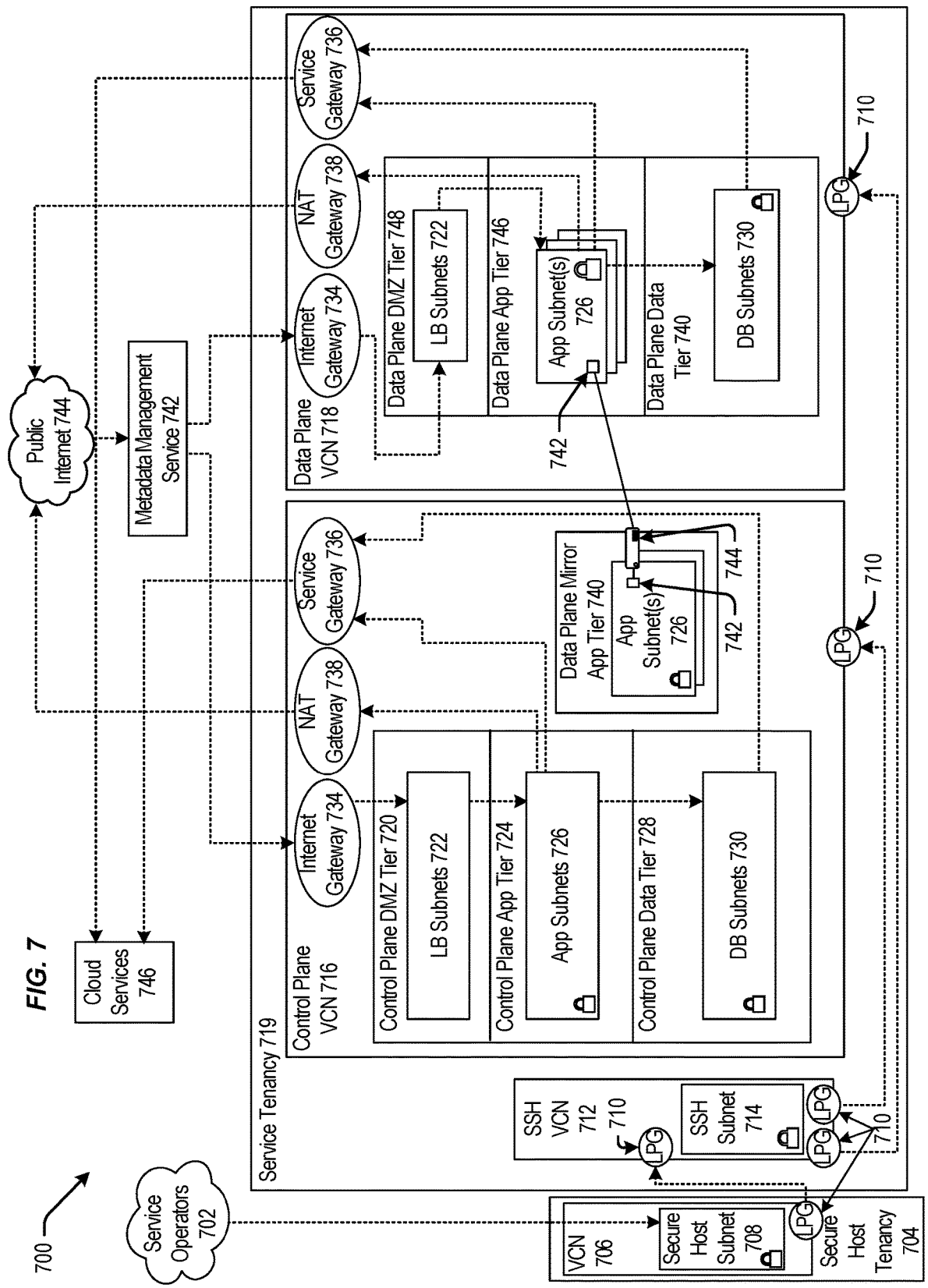
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 9, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Memory that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
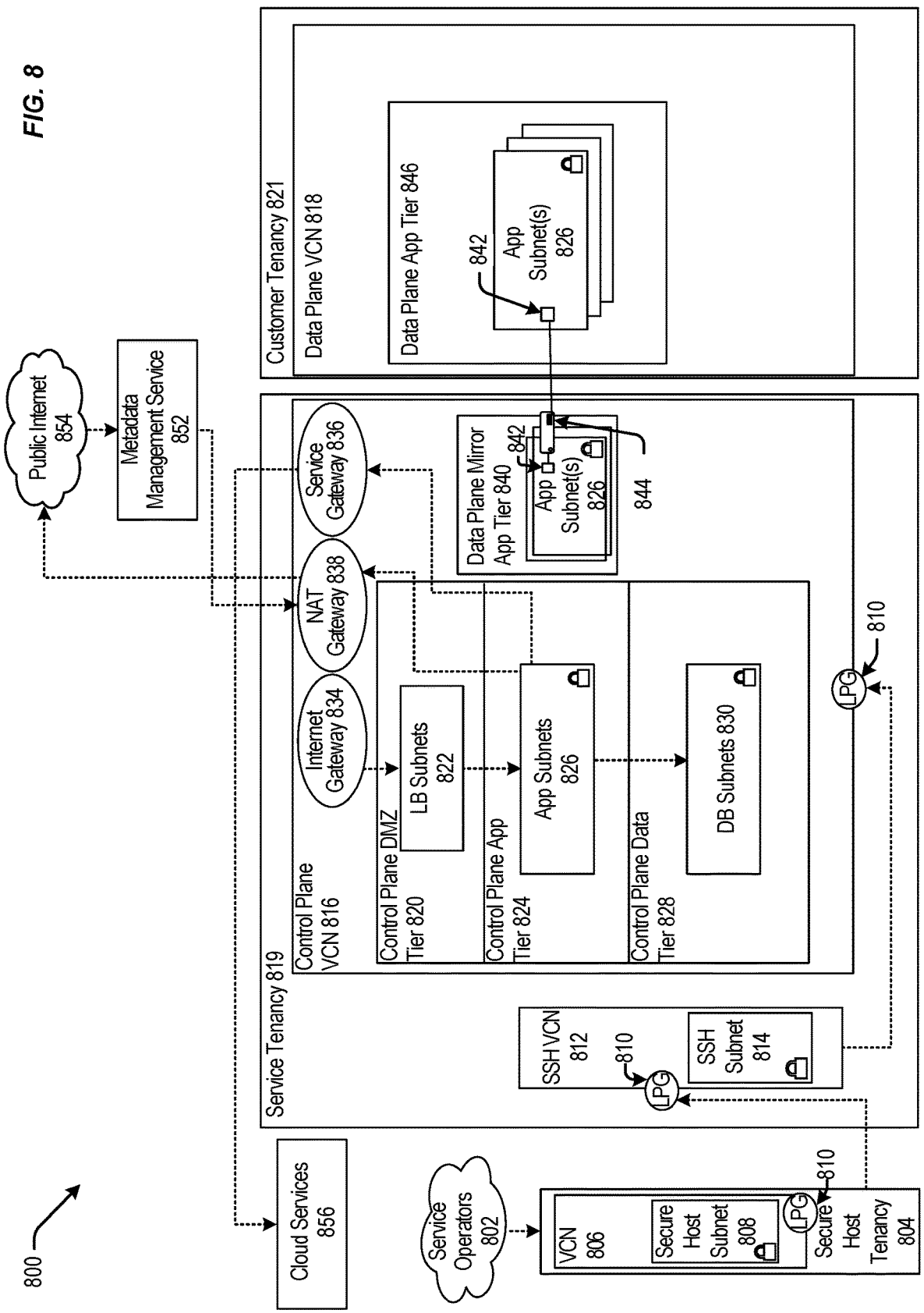
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 702 of FIG. 7) can be communicatively coupled to a secure host tenancy 804 (e.g. the secure host tenancy 704 of FIG. 7) that can include a virtual cloud network (VCN) 806 (e.g. the VCN 706 of FIG. 7) and a secure host subnet 808 (e.g. the secure host subnet 708 of FIG. 7). The VCN 806 can include a local peering gateway (LPG) 810 (e.g. the LPG 710 of FIG. 7) that can be communicatively coupled to a secure shell (SSH) VCN 812 (e.g. the SSH VCN 712 of FIG. 7) via an LPG 710 contained in the SSH VCN 812. The SSH VCN 812 can include an SSH subnet 814 (e.g. the SSH subnet 714 of FIG. 7), and the SSH VCN 812 can be communicatively coupled to a control plane VCN 816 (e.g. the control plane VCN 716 of FIG. 7) via an LPG 810 contained in the control plane VCN 816. The control plane VCN 816 can be contained in a service tenancy 819 (e.g. the service tenancy 719 of FIG. 7), and the data plane VCN 818 (e.g. the data plane VCN 718 of FIG. 7) can be contained in a customer tenancy 821 that may be owned or operated by users, or customers, of the system.

The control plane VCN 816 can include a control plane DMZ tier 820 (e.g. the control plane DMZ tier 720 of FIG. 7) that can include LB subnet(s) 822 (e.g. LB subnet(s) 722 of FIG. 7), a control plane app tier 824 (e.g. the control plane app tier 724 of FIG. 7) that can include app subnet(s) 826 (e.g. app subnet(s) 726 of FIG. 7), a control plane data tier 828 (e.g. the control plane data tier 728 of FIG. 7) that can include database (DB) subnet(s) 830 (e.g. similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g. the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g. the service gateway of FIG. 7) and a network address translation (NAT) gateway 838 (e.g. the NAT gateway 738 of FIG. 7). The control plane VCN 816 can include the service gateway 836 and the NAT gateway 838.

The control plane VCN 816 can include a data plane mirror app tier 840 (e.g. the data plane mirror app tier 740 of FIG. 7) that can include app subnet(s) 826. The app subnet(s) 826 contained in the data plane mirror app tier 840 can include a virtual network interface controller (VNIC) 842 (e.g. the VNIC of 742) that can execute a compute instance 844 (e.g. similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g. the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g. the metadata management service 752 of FIG. 7) that can be communicatively coupled to public Internet 854 (e.g. public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g. cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
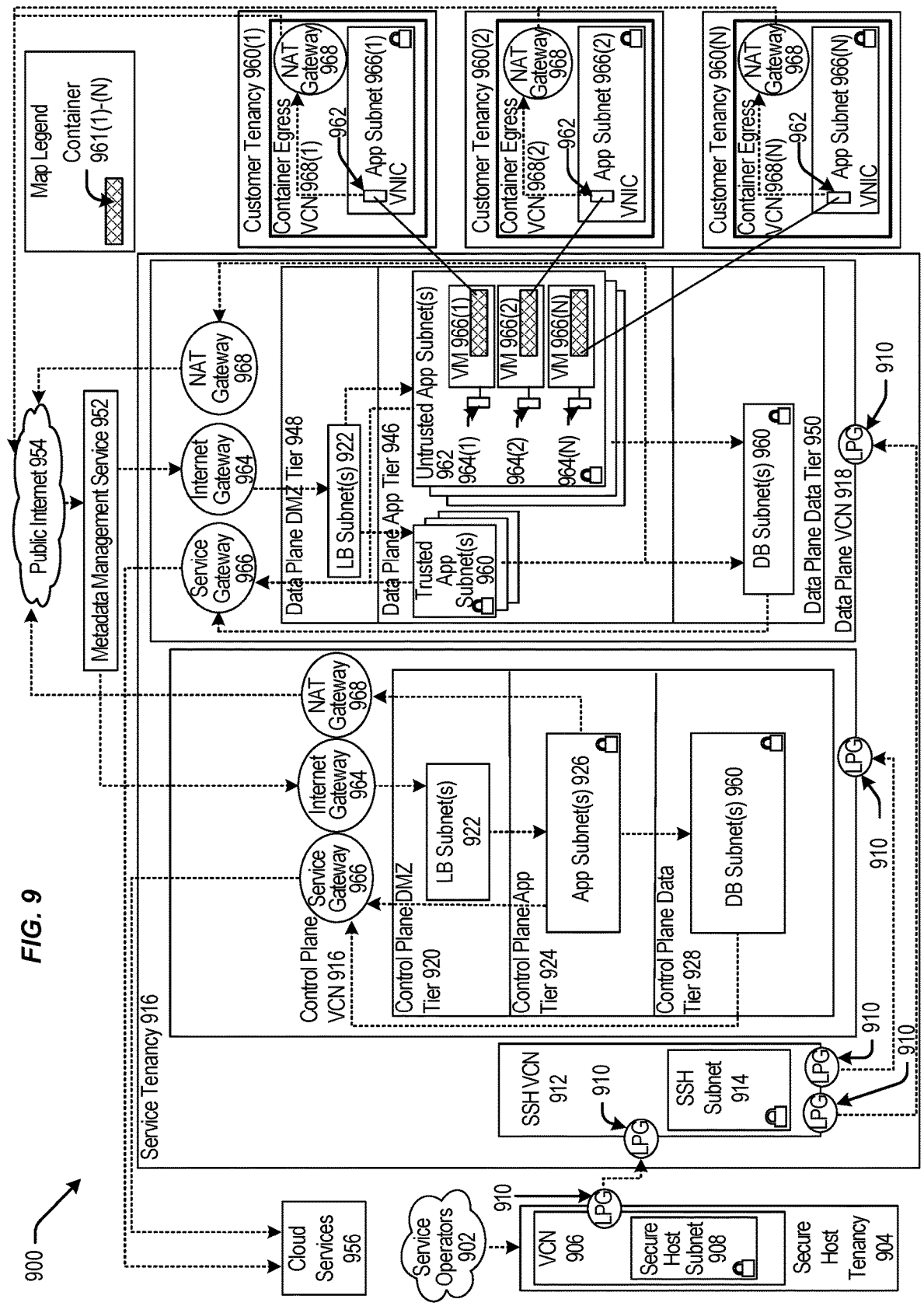
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 702 of FIG. 7) can be communicatively coupled to a secure host tenancy 904 (e.g. the secure host tenancy 704 of FIG. 7) that can include a virtual cloud network (VCN) 906 (e.g. the VCN 706 of FIG. 7) and a secure host subnet 908 (e.g. the secure host subnet 708 of FIG. 7). The VCN 906 can include an LPG 910 (e.g. the LPG 710 of FIG. 7) that can be communicatively coupled to an SSH VCN 912 (e.g. the SSH VCN 712 of FIG. 7) via an LPG 910 contained in the SSH VCN 912. The SSH VCN 912 can include an SSH subnet 914 (e.g. the SSH subnet 714 of FIG. 7), and the SSH VCN 912 can be communicatively coupled to a control plane VCN 916 (e.g. the control plane VCN 716 of FIG. 7) via an LPG 910 contained in the control plane VCN 916 and to a data plane VCN 918 (e.g. the data plane 718 of FIG. 7) via an LPG 910 contained in the data plane VCN 918. The control plane VCN 916 and the data plane VCN 918 can be contained in a service tenancy 919 (e.g. the service tenancy 719 of FIG. 7).

The control plane VCN 916 can include a control plane DMZ tier 920 (e.g. the control plane DMZ tier 720 of FIG. 7) that can include load balancer (LB) subnet(s) 922 (e.g. LB subnet(s) 722 of FIG. 7), a control plane app tier 924 (e.g. the control plane app tier 724 of FIG. 7) that can include app subnet(s) 926 (e.g. similar to app subnet(s) 726 of FIG. 7), a control plane data tier 928 (e.g. the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g. the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 7) and a network address translation (NAT) gateway 938 (e.g. the NAT gateway 738 of FIG. 7). The control plane VCN 916 can include the service gateway 936 and the NAT gateway 938.

The data plane VCN 918 can include a data plane app tier 946 (e.g. the data plane app tier 746 of FIG. 7), a data plane DMZ tier 948 (e.g. the data plane DMZ tier 748 of FIG. 7), and a data plane data tier 950 (e.g. the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g. public Internet 754 of FIG. 7).

The Internet gateway 934 contained in the control plane VCN 916 and contained in the data plane VCN 918 can be communicatively coupled to a metadata management service 952 (e.g. the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
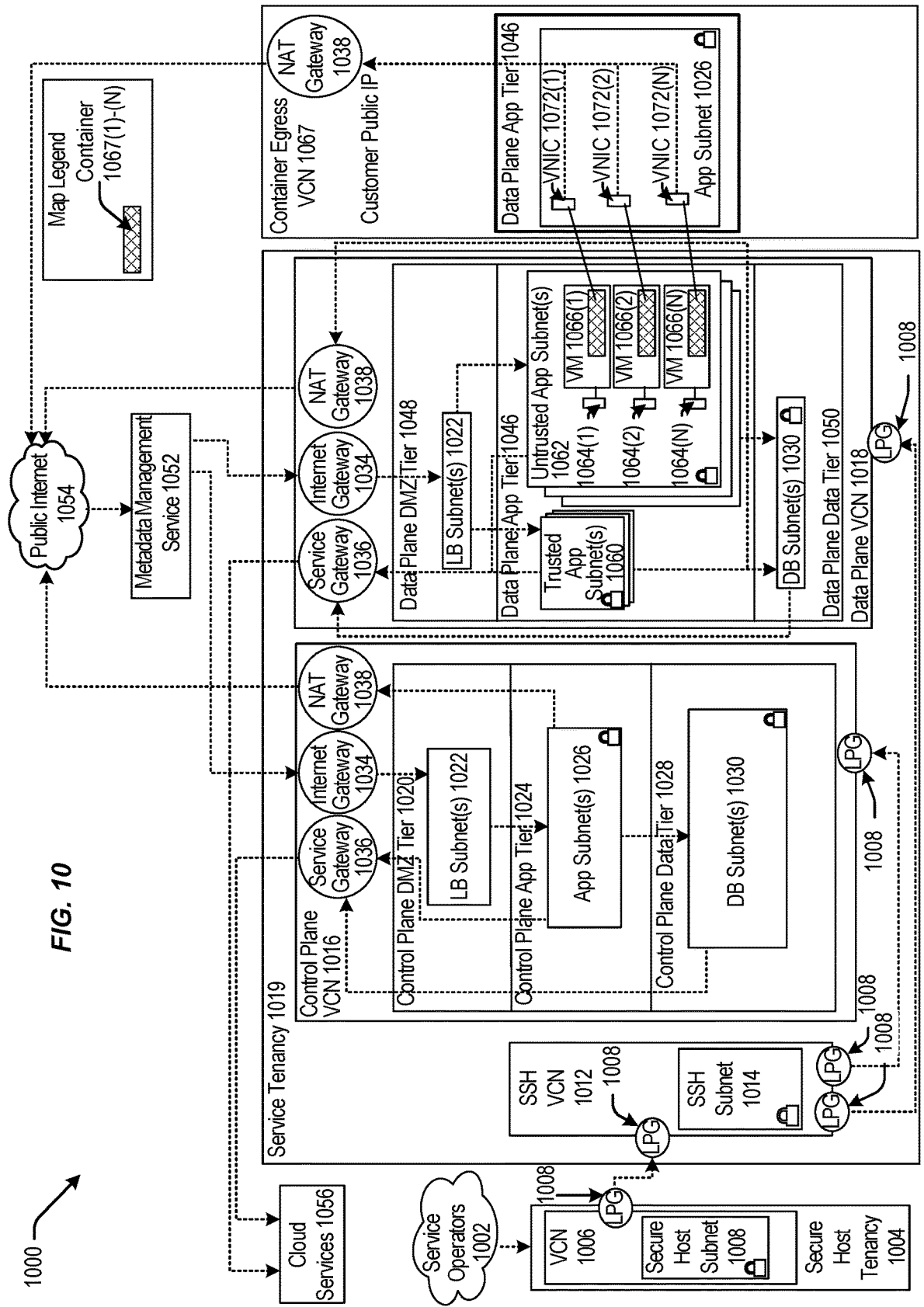
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 702 of FIG. 7) can be communicatively coupled to a secure host tenancy 1004 (e.g. the secure host tenancy 704 of FIG. 7) that can include a virtual cloud network (VCN) 1006 (e.g. the VCN 706 of FIG. 7) and a secure host subnet 1008 (e.g. the secure host subnet 708 of FIG. 7). The VCN 1006 can include an LPG 1010 (e.g. the LPG 710 of FIG. 7) that can be communicatively coupled to an SSH VCN 1012 (e.g. the SSH VCN 712 of FIG. 7) via an LPG 1010 contained in the SSH VCN 1012. The SSH VCN 1012 can include an SSH subnet 1014 (e.g. the SSH subnet 714 of FIG. 7), and the SSH VCN 1012 can be communicatively coupled to a control plane VCN 1016 (e.g. the control plane VCN 716 of FIG. 7) via an LPG 1010 contained in the control plane VCN 1016 and to a data plane VCN 1018 (e.g. the data plane 718 of FIG. 7) via an LPG 1010 contained in the data plane VCN 1018. The control plane VCN 1016 and the data plane VCN 1018 can be contained in a service tenancy 1019 (e.g. the service tenancy 719 of FIG. 7).

The control plane VCN 1016 can include a control plane DMZ tier 1020 (e.g. the control plane DMZ tier 720 of FIG. 7) that can include LB subnet(s) 1022 (e.g. LB subnet(s) 722 of FIG. 7), a control plane app tier 1024 (e.g. the control plane app tier 724 of FIG. 7) that can include app subnet(s) 1026 (e.g. app subnet(s) 726 of FIG. 7), a control plane data tier 1028 (e.g. the control plane data tier 728 of FIG. 7) that can include DB subnet(s) 1030 (e.g. DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 7) and a network address translation (NAT) gateway 1038 (e.g. the NAT gateway 738 of FIG. 7). The control plane VCN 1016 can include the service gateway 1036 and the NAT gateway 1038.

The data plane VCN 1018 can include a data plane app tier 1046 (e.g. the data plane app tier 746 of FIG. 7), a data plane DMZ tier 1048 (e.g. the data plane DMZ tier 748 of FIG. 7), and a data plane data tier 1050 (e.g. the data plane data tier 750 of FIG. 7). The data plane DMZ tier 1048 can include LB subnet(s) 1022 that can be communicatively coupled to trusted app subnet(s) 1060 (e.g. trusted app subnet(s) 960 of FIG. 9) and untrusted app subnet(s) 1062 (e.g. untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g. public Internet 754 of FIG. 7).

The Internet gateway 1034 contained in the control plane VCN 1016 and contained in the data plane VCN 1018 can be communicatively coupled to a metadata management service 1052 (e.g. the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
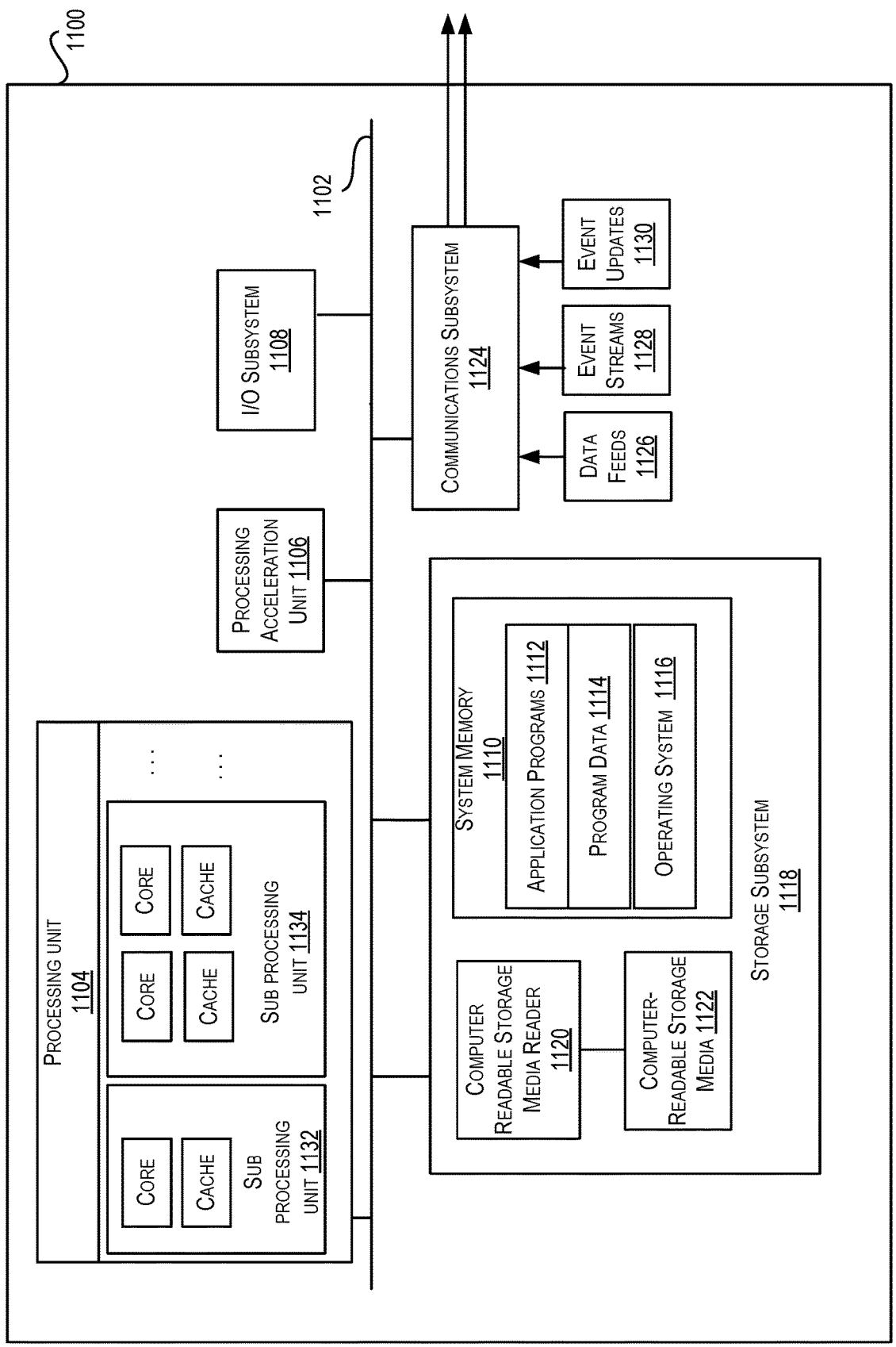
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 11 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 902.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method for capturing snapshots of key management data across a series of nodes in a cloud infrastructure, the method comprising:
    requesting, by a snapshot orchestrator, a plurality of snapshot instances from a plurality of nodes in a cloud infrastructure service, wherein:
        the cloud infrastructure service stores keys for components across the cloud infrastructure, and maintains log records of the keys,
        individual snapshot instances, of the plurality of snapshot instances:
            correspond to respective entries in the log records, and
            comprise modifications to a plurality of client keys maintained by respective nodes of the plurality of nodes, and
        the plurality of client keys decrypt client data stored across the cloud infrastructure service;
    obtaining, by the snapshot orchestrator from plurality of nodes:
        the plurality of snapshot instances, and
        metadata corresponding to the plurality of snapshot instances;
    verifying the plurality of snapshot instances received from the plurality of nodes include data intelligible to recover states of the plurality of client keys; and
    responsive to verifying the plurality of snapshot instances, storing the plurality of snapshot instances and the metadata at a storage node, allowing for subsequent retrieval of the plurality of snapshot instances and recreation of the modifications to the plurality of client keys at any of the plurality of nodes.

2. The method of claim 1, wherein requesting the snapshot comprises adding an entry to a log record specifying a request to capture the plurality of snapshot instances, wherein each of the plurality of nodes capture the plurality of snapshot instances responsive to identifying the added entry to the log record.

3. The method of claim 2, wherein the plurality of snapshot instances are requested responsive to either an expiration of a threshold time duration or detecting an addition of a threshold number of entries to the log record.

4. The method of claim 1, wherein each modification to any of the plurality of client keys identified at a first node in a first region is synchronized across other nodes in other regions of the cloud infrastructure service by a cross region snapshot copier.

5. The method of claim 1, wherein verifying the plurality of snapshot instances comprises:
    identifying, for each of the received snapshot instances, an entropy value specific to each snapshot instance and each corresponding node; and
    determining whether the identified entropy values for each of the received snapshot instances are within a threshold similarity to one another, wherein the plurality of snapshot instances are verified responsive to the entropy values being within the threshold similarity.

6. The method of claim 1, wherein:
    each of the modifications correspond with an entry in a log record; and
    the method further comprises truncating, by the snapshot orchestrator, the individual snapshot instances, the truncation removing modifications to the plurality of client keys with corresponding entries in the log record prior to a specified entry of the log record.

7. The method of claim 1, further comprising:
obtaining an outage notification at a first node of the plurality of nodes;
retrieving a first snapshot instance of the plurality of snapshot instances and corresponding metadata from the storage node; and
providing the first snapshot instance and the corresponding metadata to the first node,
wherein the first node recreates the modifications to the plurality of client keys using the first snapshot instance and the corresponding metadata.

8. The method of claim 7, wherein the metadata includes a key to access a specified partition of the first node, each partition of the first node independently maintaining log records for a client, and wherein the snapshot orchestrator accesses the partition using the key to provide the stored snapshot instance and corresponding metadata to the partition of the first node.

9. A snapshot management system, comprising:
a processor; and
a non-transitory computer-readable medium including instructions that, when executed by the processor, cause the processor to:
request a plurality of snapshot instances from a plurality of nodes in a cloud infrastructure service, wherein:
the cloud infrastructure service stores keys for components across the cloud infrastructure, and maintains log records of the keys,
individual snapshot instances, of the plurality of snapshot instances:
correspond to respective entries in the log records, and
comprise modifications to a plurality of client keys maintained by respective nodes of the plurality of nodes, and
the plurality of client keys decrypt client data stored across the cloud infrastructure service;
obtain, from the plurality of nodes
the plurality of snapshot instances; and
metadata corresponding to the plurality of snapshot instances;
verify the plurality of snapshot instances received from the plurality of nodes include data intelligible to recover states of the plurality of client keys; and
responsive to verifying the plurality of snapshot instances, store the plurality of snapshot instances and the metadata at a storage node, wherein the snapshot instance and corresponding metadata allows recreation of modifications to the plurality of client keys at any of the plurality of nodes.

10. The snapshot management system of claim 9, wherein:
each modification corresponds with a log sequence record in an append-only log record; and
requesting the plurality of snapshot instances comprise adding a specified log sequence number to the append-only log record that specifies a request to capture the plurality of snapshot instances, wherein each of the plurality of nodes capture the plurality of snapshot instances responsive to identifying the added specified log sequence number in the append-only log record.

11. The snapshot management system of claim 10, wherein the processor is further configured to:
responsive to verifying the plurality of snapshot instances, update a table to include the metadata corresponding with the plurality of snapshot instances, wherein the metadata relates to any of: the specified log sequence number of the append-only log record, a status in capturing the plurality of snapshot instances, and a timestamp in which the request for the plurality of snapshot instances was initiated.

12. The snapshot management system of claim 10, wherein the processor is further configured to:
identify entropy values of each of the plurality of snapshot instances, wherein each entropy value is based on at least the added specified log sequence number for the append-only log record; and
determine whether the identified entropy values for each of the received snapshot instances are within a threshold similarity to one another, wherein the plurality of snapshot instances are verified responsive to the entropy values being within the threshold similarity.

13. The snapshot management system of claim 10, wherein:
the processor is further configured to truncate the individual snapshot instances, the truncating removing modifications to the plurality of client keys with corresponding entries in the append-only log record prior to the added specified log sequence number in the append-only log record.

14. The snapshot management system of claim 9, wherein the processor is further configured to:
obtain an outage notification at a first node of the plurality of nodes;
retrieve a first snapshot instance of the plurality of snapshot instances and corresponding metadata from the storage node; and
provide the first snapshot instance and the corresponding metadata to the first node,
wherein the first node recreates the modifications to the plurality of client keys using the first snapshot instance and the corresponding metadata.

15. A non-transitory computer-readable medium including stored thereon a sequence of instructions which, when executed by a processor, causes the processor to perform operations comprising:
requesting, by a snapshot orchestrator, a plurality of snapshot instances from a plurality of nodes in a cloud infrastructure service, wherein:
the cloud infrastructure service stores keys for components across the cloud infrastructure, and maintains log records of the keys,
individual snapshot instances, of the plurality of snapshot instances:
correspond to respective entries in the log records, and
comprise modifications to a plurality of client keys maintained by respective nodes of the plurality of nodes, and
the plurality of client keys decrypt client data stored across the cloud infrastructure service;
obtaining the plurality of snapshot instances and corresponding metadata from the plurality of nodes:
the plurality of snapshot instances; and
metadata corresponding to the plurality of snapshot instances;
verifying the plurality of snapshot instances received from the plurality of nodes include data intelligible to recover states of the plurality of client keys; and
responsive to verifying the plurality of snapshot instances, storing the plurality of snapshot instances and the metadata at a storage node, allowing for subsequent retrieval of the plurality of snapshot instances and recreation of the modifications to the plurality of client keys at any of the plurality of nodes.

16. The non-transitory computer-readable medium of claim 15, wherein the process further comprises:
obtaining an outage notification at a first node of the plurality of nodes;
retrieving a first snapshot instance of the plurality of snapshot instances and corresponding metadata from the storage node; and
providing the first snapshot instance and the corresponding metadata to the first node,
wherein the first node recreates the modifications to the plurality of client keys using the first snapshot instance and the corresponding metadata.

17. The non-transitory computer-readable medium of claim 15, wherein the operations further comprise:
determining entropy values for the received snapshot instances; and
determining that the entropy values for each of the received snapshot instances are within a threshold similarity,
wherein the entropy values represent a number of bits in each snapshot instance.

18. The non-transitory computer-readable medium of claim 15, wherein:
the modifications correspond with entries in log records; and
the plurality of snapshot instances are requested responsive to either an expiration of a threshold time duration or detecting an addition of a threshold number of entries to the corresponding log record.

19. The non-transitory computer-readable medium of claim 15, wherein:
each of the modifications correspond with an entry in a log record; and
the process further comprises truncating the individual snapshot instances, the truncating removing modifications to the plurality of client keys with corresponding entries in the log record prior to a specified entry of the log record.

20. The non-transitory computer-readable medium of claim 15, wherein
requesting the snapshot comprises adding a log sequence number to the log record specifying a request to capture the plurality of snapshot instances, wherein each of the plurality of nodes capture the plurality of snapshot instances responsive to identifying the added log sequence number to the log record.

* * * * *